United States Patent [19]

Seltzer et al.

[11] Patent Number: 4,693,511

[45] Date of Patent: Sep. 15, 1987

[54] AUTO SEAT COVER

[75] Inventors: Samuel M. Seltzer; Saul Dennison, both of Livingston; Frank Dolan, Sr., Essex Fells, all of N.J.

[73] Assignee: Allison Corporation, Livingston, N.J.

[21] Appl. No.: 904,417

[22] Filed: Sep. 8, 1986

[51] Int. Cl.[4] ............................................. A47C 27/00
[52] U.S. Cl. ...................................... 297/219; 297/224
[58] Field of Search ....................... 297/219, 218, 224; 5/496, 494, 498, 499, 500

[56] References Cited

U.S. PATENT DOCUMENTS

| | | | |
|---|---|---|---|
| 1,882,169 | 10/1932 | Wedler | 297/219 |
| 2,820,510 | 1/1958 | Sugerman | 297/225 X |
| 3,117,817 | 1/1964 | Mednick | 297/224 |
| 4,232,898 | 11/1980 | Bodrero | 297/224 |
| 4,400,030 | 8/1983 | Maruzzo et al. | 297/224 |

Primary Examiner—James T. McCall
Attorney, Agent, or Firm—Helfgott & Karas

[57] ABSTRACT

An auto seat cover for an auto seat which includes a back cover portion and a seat portion joined along a common seam. Straps extend from the common seam for feeding through a crevice of the auto seat between its back rest and its seat cushion. Loops depend from the lower free edge of the back cover portion for securement to the straps. The auto seat cover remains snugly on the seat with the free edge of the back portion pulled down over the rear of the back rest.

10 Claims, 6 Drawing Figures

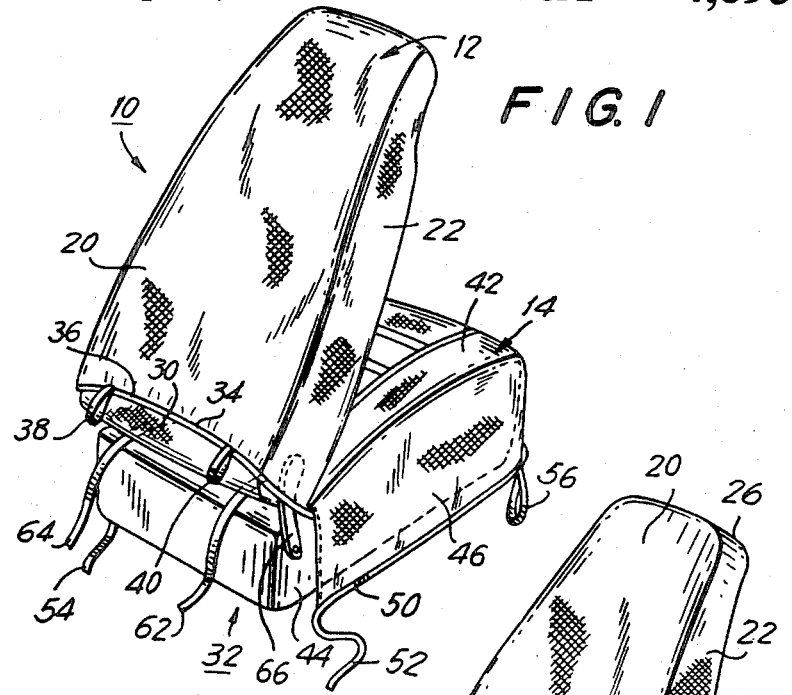
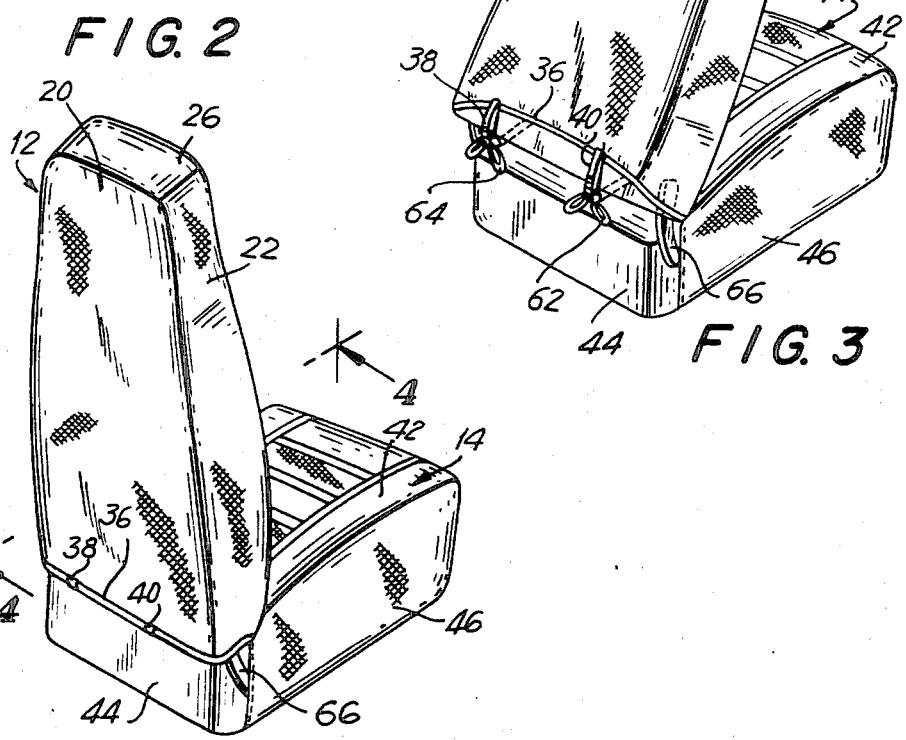
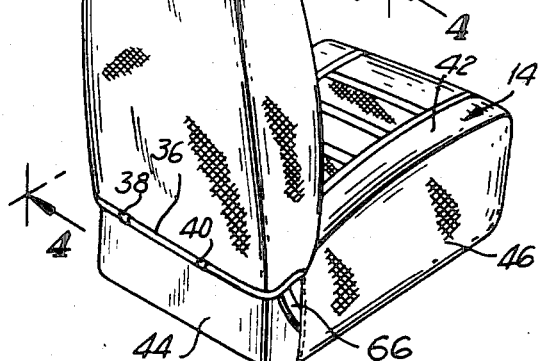

AUTO SEAT COVER

BACKGROUND OF THE INVENTION

This invention relates to auto seat covers, and more particularly to a seat cover which snugly fits an auto seat and avoids riding up during use of the auto seat.

Auto seat covers are frequently utilized for aesthetically beautifying the auto seat or covering torn or impaired portions of the seat. Once the auto seat cover is in place, it must provide a snug fit in order to avoid continuous manipulation of the seat cover.

Although there are many types of auto seats each having a varying style or model of a particular vehicle, auto seat covers generally come in a limited number of styles. A specific seat cover is therefore designed to cover a generic type of seat regardless of the particular car style or make. The seat covers come typically to fit solid back cars, front seat or back seat, bucket seats or other such generic type of auto seat.

The seat cover is typically installed by the user. Since it is a generic or universal type of seat cover, it includes various tie down arrangements to secure the seat cover in place on the auto seat. However, because of the tie down arrangements, it has been found that during regular use of the auto seat, the seat cover tends to pull or ride up along portions of the auto seat and needs continuous retightening and refitting. In many cases, the failure of the seat cover to remain snugly in place results in the frustration of the user who totally disregards the use of the seat cover and rather maintains the unsightly appearance of a torn or impaired auto seat rather than the continuous inconvenience of readjusting the seat cover.

Accordingly, there is required an improved type of auto seat cover which can remain snugly fit onto the auto seat and remains securely in its place despite continuous use of the auto seat.

SUMMARY OF THE INVENTION

It is therefore an object of the present invention to provide an improved auto seat cover which avoids the aforementioned problems of prior art seat covers.

Another object of the present invention is to provide an auto seat cover which remains snugly in place on the auto seat even with regular and continuous use of the auto seat.

Yet another object of the present invention is to provide an auto seat cover which is easy to install on the auto seat and which can be secured to snugly fit onto the auto seat without riding up along portions of the auto seat.

Yet another object of the present invention is to provide an auto seat cover for use with an auto seat of the type that bends forward, whereby the seat cover remains snugly in place despite bending forward of the auto seat.

Yet a further object of the present invention is to provide an auto seat cover for an auto seat which includes improved securing mechanism to retain the auto seat cover snugly in place on the auto seat.

Briefly, in accordance with the present invention there is provided an auto seat cover having a back cover and a seat portion. The back cover is in the form of an open mouthed tubular cover terminating in a lower free edge. The back cover envelops the back rest of an auto seat. The seat portion is joined to the back cover along a seam and fits onto the seat cushion of the auto seat. At least one strap extends from the seam which joins the back cover with the seat portion. The strap feeds through a crevice in the auto seat between its back rest and its seat cushion. At least one loop depends from the lower free edge of the back cover and can be secured to the strap. In this way the auto seat cover is snugly retained in place on the auto seat. The seam is tightly tucked into the crevice and remains in place. The lower free edge of the back cover remains pulled down over the rear of the back rest.

With a bendable type auto seat where the back rest bends forward, the present auto seat cover will remain snugly in place even as the back rest is bent forward. In fact when the back rest is bent forward, it actually tugs more at the seat portion to further retain it tightly in place. It also keeps down the free edge of the back cover so that even after release of the back rest, the lower free edge of the back cover still remains pulled down over the back rest.

The aforementioned objects, features and advantages of the invention will, in part, be pointed out with particularity, and will, in part, become obvious from the following more detailed description of the invention, taken in conjunction with the drawing which forms an integral part thereof.

BRIEF DESCRIPTION OF THE DRAWING

In the drawing:

FIG. 1 is a perspective view taken from the rear of the auto seat with the auto seat cover of the present invention being installed on the auto seat;

FIG. 2 is a perspective view of the auto seat cover properly installed on the auto seat;

FIG. 3 is a view similar to that shown in FIG. 2 but showing the back rest bent forward with the auto seat cover being still snugly retained in place;

In the various figures of the drawing like reference characters designate like parts.

DESCRIPTION OF THE PREFERRED EMBODIMENT

Figure 4:
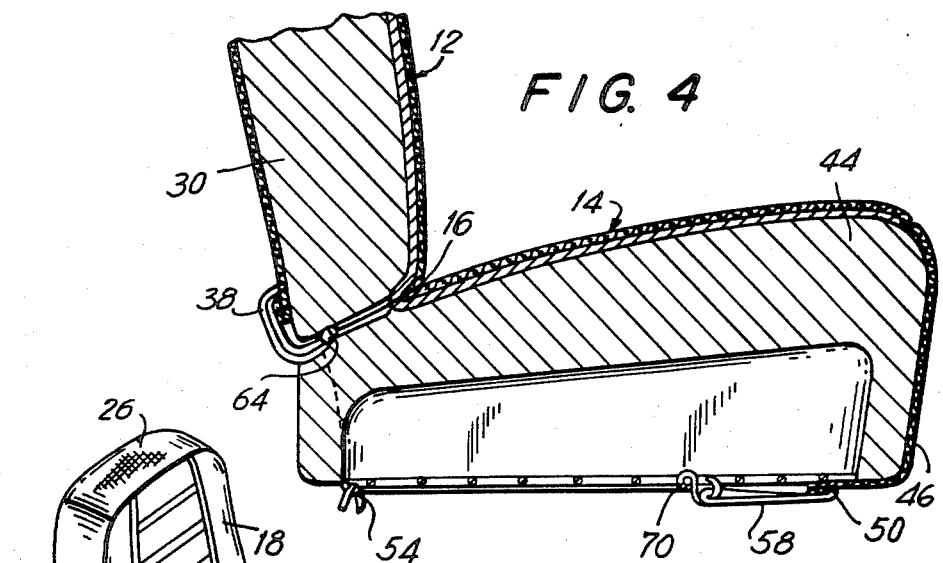
FIG. 4 is a cross sectional view taken along lines 4—4 of FIG. 2.
Figure 5:
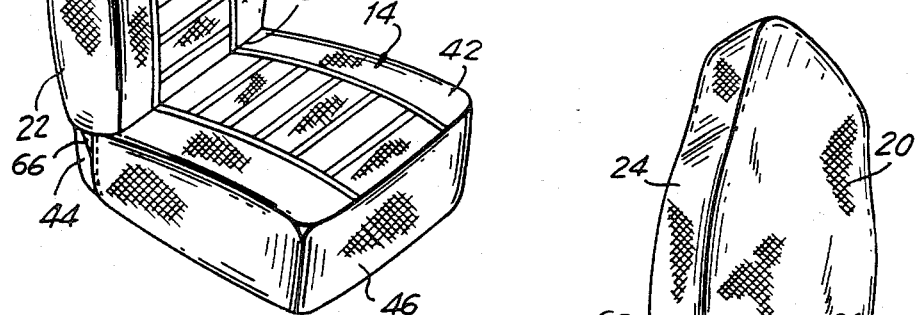
FIG. 5 is a front perspective view of the auto seat with the auto seat cover in place.

Referring now to the figures, there is shown an auto seat cover 10 including a back cover portion 12 and a seat portion 14. The two sections 12, 14 are joined along a junction line 16 formed as a transverse seam.

The back cover portion 12 includes a front wall or face 18 and a rear wall or face 20 which are interconnected about their sides by means of the side walls 22, 24 and the top wall 26. The back cover portion is made in the form of an open mouthed tubular sleeve which can suitably slide onto the back rest 30 of the auto seat, shown generally at 32.

The tubular back cover portion 12 terminates in a lower peripheral edge 34. The peripheral edge at the bottom of the front wall 18 is interconnected at the seam 16. The portion of the peripheral edge 34 terminating at the bottom of the back wall 20 includes an elastic strip 36. A pair of loops 38, 40 depend from the lower free edge at the back wall 20 and are interconnected to the elastic 36.

The seat portion 14 is formed with a substantially horizontal section 42 which fits onto the seat cushion 44 of the auto seat. A peripheral skirt 46 depends from the horizontal flat portion 42 and extends along at least three sides of the flat horizontal portion 42. At the lower edge of the skirt portion 46 an elastic trim 50 can be included for aiding in snugly retaining the seat portion in place on the seat cushion 44.

Tails 52, 54 can extend at the edges of the elastic portion 50. Likewise, additional loops 56, 58 can be provided at the corners with yet a further loop 60 provided at the mid section of the front part of the skirt 46.

The back edge of the flat horizontal seat portion 42 is joined at the seam 16. Extending rearwardly from the seam are a pair of straps 62, 64. The straps are arranged to fit into the crevice between the back rest 30 of the seat and the seat cushion 44.

In one type of auto seat arrangement, the back rest 30 can be bent forward by means of a pivot arm 66 interconnecting the back rest 30 with the seat cushion 44 of the auto seat 32.

Figure 6:
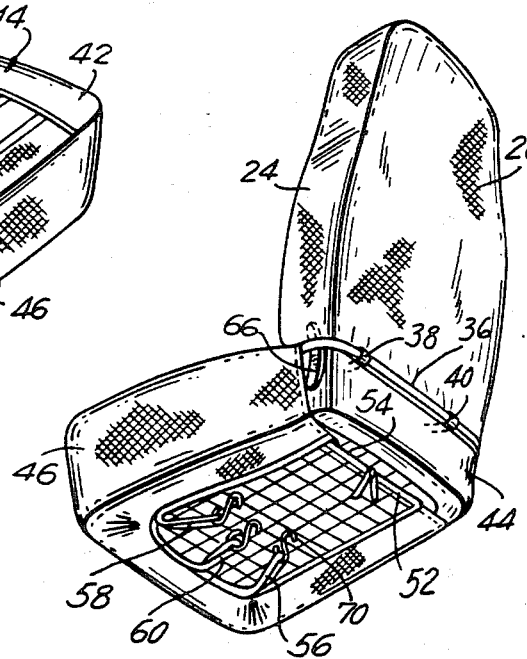
FIG. 6 is a perspective view showing an under side of the auto seat and including the attachments for the seat portion to the underneath springs of the auto seat.

In installing the auto seat cover, the tubular back cover is slid onto the back rest and is pulled down into place. The seam 16 is tucked into the crevice between the back rest and the seat cushion. The straps 60, 64 extend through the crevice to the back of the auto seat. The flat seat portion is then drapped around the seat cushion with the skirt 46 extending around the peripheral edge. The tails 52, 54 are tied together underneath the seat, as best shown in 56. The loops, 56, 58 and 60 are hooked onto the springs or underneath wiring beneath the seat by means of S-hooks 70, as shown in FIG. 6.

In order to secure the seat in place, the straps 62, 64 fit into the aligned loops 40, 38 at the lower edge of the back cover and are secured in place. The straps 62, 64 can either be tied to each other or, as shown in the Figures, each strap can be tied on to itself about the loop.

Once the seat cover is properly installed, the tied together straps and loops can be tucked into the crevice as shown in FIGS. 2 and 4 so that they are not visibly extending or hanging downwardly at the rear of the auto seat.

With prior art seat covers, the major problem is to retain the seat cover snugly in place. One way of installing the seat cover and keeping it in place was to secure a plastic tube or sleeve at the junction between the back cover portion and the seat portion and to press the tube or sleeve into the crevice. This resulted in having the tube or sleeve continuously being pulled out of that crevice each time someone sits or slides along the seat portion. The tube or sleeve would again have to be pushed into the crevice to keep it in place.

Another prior art approach in restraining the seat cover was to use the straps as are presently provided extending through the crevice between the back rest and the seat cushion. However, these straps would then be tied underneath the seat cushion. The straps could then be tied to each other or typically they would be tied to the springs or underneath wiring beneath the seat cushion. While this method did serve to keep the seat portion in place on the seat cushion, the problem was that the back cover continued to ride up the back rest.

This last problem was of special concern in the type of seat where the back rest could bend forward onto the seat cushion. Each time the back rest would be bent forward, the rear wall of the back cover would ride up the back rest. When the auto seat was returned to its upright position, that back cover would remain up and would not return to its original position. This resulted in an unslightly appearance of the auto seat cover. Also it resulted in having the back cover being loose and continuously being pulled toward the front without having it retained snugly on the auto seat.

In the present invention, by means of having the straps 52, 64 secured to loops depending from the lower free edge of the back cover portion, numerous benefits are achieved. Firstly, the seat portion is securely retained in place without the need of a tube or sleeve inserted in the crevice. The seat portion will remain tightly in place even though an individual slides along the seat portion.

Additionally, the back cover portion will also remain pulled down and will not ride up during continued use of the auto seat cover. An especially important benefit occurs when the seat is of the type that bends forward. When the auto seat is bent forward, there will be a tendency for the elastic 36 to slightly pull upwardly. However, that will be restrained by the tied loops 38, 40 to the strap 62, 64.

As a result, instead of riding up the rear of the back rest, the lower edge 36 will remain down in place. In fact, it will also have a tendency of drawing tighter the seat portion 42. Even when the seat is then returned to its upright position, as shown in FIG. 2, the seat cover will still remain snugly in place and the lower edge of the seat cover will be pulled down over the rear of the back rest.

Although the invention has been described in connection with an automobile, it should be understood that this seat cover is applicable to a truck and will also be applicable to both two-door and four-door cars. Accordingly, the term "auto" is used in a broad sense to describe all vehicles having seats on which the present covers can be utilized.

There has been disclosed heretofore the best embodiment of the invention presently contemplated. However, it is to be understood that various changes and modifications may be made thereto without departing from the spirit of the invention.

What is claimed is:

1. A one piece auto seat cover comprising an open mouthed tubular back cover terminating in a lower free edge, the back cover enveloping the back rest of an auto seat, and a seat portion intergrally joined to said back cover at an interconnected common junction for fitting onto the seat cushion of the auto seat, strap means extending from the common junction of the back cover with the seat portion for feeding through a crevice of the auto seat between its back rest and its seat cushion, and loop means depending from the lower free edge of the back cover for securing to said strap means thereby snugly retaining the seat cover in place on the auto seat with the free edge of the back portion pulled down over the rear of the back rest.

2. An auto seat cover as in claim 1, wherein said strap means and said loop means are in alignment.

3. An auto seat cover as in claim 1, wherein said back cover comprises front and rear spaced apart walls, the lower edge of said front wall defining a medial edge for joining to said seat portion, the lower edge of said rear wall defining said free edge.

4. An auto seat cover as in claim 3, wherein said medial edge and said free edge lie in a substantially common horizontal plane.

5. An auto seat cover as in claim 3, wherein said free edge extends to approximately to the lower end of the rear of the back rest.

6. An auto seat cover comprising an open mouthed tubular back cover terminating in a lower free edge, the back cover enveloping the back rest of an auto seat, and a seat portion joined to said back cover for fitting onto the seat cushion of the auto seat, strap means extending from the juncture of the back cover with the seat portion for feeding through a crevice of the auto seat between its back rest and its seat cushion, and loop means depending from the lower free edge of the back cover for securing to said strap means thereby snugly retaining the seat cover in place on the auto seat with the free edge of the back portion pulled down over the rear of the back rest, wherein the back rest of the auto seat bends forward, and wherein the securement of said strap means to said loop means is such as to prevent riding up of the free edge along the rear of the back rest upon bending forward of the back rest, and wherein said strap means draws said seat portion, whereby said seat portion tightens its fit onto the seat cushion upon bending forward of the back rest.

7. An auto seat cover as in claim 1, and comprising a seam joining said back cover and said seat portion, said strap means being secured at said seam and extending therefrom.

8. An auto seat cover as in claim 1, wherein there are two straps and two loops, each strap being aligned with a corresponding loop.

9. An auto seat cover as in claim 1, wherein said portion comprises a skirt, and comprising elastic loops connected to edges of said skirt for securement beneath said seat cover.

10. An auto seat cover as in claim 1, and comprising an elastic strip along said lower free edge.

* * * * *